United States Patent [19]
Smith

[11] Patent Number: 6,018,748
[45] Date of Patent: *Jan. 25, 2000

[54] DYNAMIC LINKABLE LABELS IN A NETWORK BROWSER PAGE

[75] Inventor: Jody K. Smith, Colorado Springs, Colo.

[73] Assignee: Sun Microsystems, Inc., Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/654,646

[22] Filed: May 28, 1996

[51] Int. Cl.⁷ .................................................. G06F 17/30
[52] U.S. Cl. ........................................ 707/501; 707/513
[58] Field of Search ...................... 395/793, 777, 395/762, 685, 200.09, 200.33, 200.34, 200.47, 200.57, 200.6, 200.68, 200.75, 200.79; 707/501, 505, 512, 513, 515, 530, 531, 10, 104; 345/329, 330, 333, 335, 347, 348, 349, 350, 352, 356

[56] References Cited

U.S. PATENT DOCUMENTS

| | | | |
|---|---|---|---|
| 5,297,249 | 3/1994 | Bernstein et al. | 395/352 |
| 5,572,643 | 11/1996 | Judson | 395/793 |

OTHER PUBLICATIONS

"Dynamic Billboard", http://www.db.erau.edu/java/billboard/index.htm, Jan. 2, 1996, pp. 1–2.

"Interactive Table of Contents", http://www.cuesys.com/winhack.htm, Jan. 24, 1996, pp. 1–6.

Meeker, "AnimNav.java Version 1.0.0", http://www.real-time.net/~elijah/old/jintro.htm, Jan. 4, 1996, pp. 1–8.

Stoflet, "link.java", Java (TM) Boutique, <http://javaboutique.internet.com/link/>, Jun. 13, 1996, pp. 1–6.

Meeker, "AnimNav.java Version 1.0.0", http://www.real-time.net/~elijah/old/jintro.htm, Jan. 4, 1996, pp. 1–11.

Mosaic and the World–Wide Web, Vetter et al., IEEE Oct. 1994, pp. 49–56.

Dynamic Linking of Software Components, Michael Franz, IEEE Mar. 1997, pp. 74–81.

Proceedings, Workshop On Mobile Computing Systems and Applications, Dec. 8, 1994, pp. 185–190, Voelker G.M. et al., "Mobisaic: An Information System for a Mobile Wireless Computing Environment".

IEE Network: The Magazine of Computer Communications, vol. 10, No. 2, Mar. 1, 1996, pp. 10–17, Schulzrinne H: "World Wide Web: Whence, Whither, What Next?".

Library Software Review, vol. 13, No. 4, Jan. 1, 1994, pp. 269–279, Duval B K et al.: "Exploring the Internet With Mosaic".

IEEE Multimedia, vol. 1, No. 1, Mar. 21, 1994, pp. 60–68, Hall W: "Ending the Tyranny of the Button".

*Primary Examiner*—Stephen S. Hong
*Attorney, Agent, or Firm*—Holland & Hart LLP

[57] ABSTRACT

In a computer network where remote user stations retrieve information from other sites in the network, a method and apparatus for creating and displaying dynamic link labels in a browser program operating on a remote user station. The link labels are created in an application program which can be run within the browser, and the link labels are designed to operate, at a minimum, in a similar manner as HTML hyper links. The link labels can also dynamically change in response to user input into the browser. For instance, the URL (Uniform Resource Locator) address or the text or appearance of the link label can change. Also, parameters based on user input can be formed by the application and used to form or alter other link labels.

7 Claims, 9 Drawing Sheets

Fig. 3A

USER FORM
- USER NAME: FRED
- USER ID: 34995
- HOME SERVER: SERVER 1 — STATUS OF SERVER 1
- http://www.SERVER 1

Fig. 3B

USER FORM
- USER NAME: FRED
- USER ID: 34995
- HOME SERVER: SERVER 1 / SERVER 2 / SERVER 3 / SERVER 4 — STATUS OF SERVER 1
- http://www.SERVER 1

Fig. 3C

USER FORM
- USER NAME: FRED
- USER ID: 34995
- HOME SERVER: SERVER 3 — STATUS OF SERVER 3
- http://www.SERVER 3

DYNAMIC LINKABLE LABELS IN A NETWORK BROWSER PAGE

BACKGROUND OF THE INVENTION

1. Field of the Invention

The present invention relates to a computing station communicating across a network, such as the Internet, for information or data to be downloaded from another computing system on the network. More particularly, the invention relates to the creation of dynamic link labels which are programmatic constructs having behavior resembling hyper links within a web page.

2. Description of Related Art

Computers or electronic devices which access information over a network, such as the Internet, generally utilize a software interface which permits the user to direct the operation of the computer in obtaining information from the network. In the case of the Internet, a network browser program is conventionally utilized as an interface which both provides the user with controls over navigating the network and displays on the user's computer information derived from the network.

Information displayed in the browser is provided by various "web sites" from various locations in the network, and is generally displayed as pages in the browser. This information can generally include text, graphics, sound files, video files, and other data. Included in the textual data obtained from the network and displayed in a browser page are labels, conventionally known as hyper links. These hyper links are associated with URL (Uniform Resource Locator) addresses which point to other locations of information in the network.

A user navigates through the network by selecting a hyper link, or label, displayed in the browser, and the browser then loads the corresponding URL and downloads the web page or other data associated therewith.

In conventional Internet and networking systems, the association between the labels displayed in a browser page and the corresponding URL address is static. In other words, for a given label displayed in a browser page, there is a corresponding URL which has already been assigned in the particular web page design and is fixedly associated to the label. Once a conventional web page has been downloaded from the Internet to the user's computer, the URL address corresponding to a given label does not change. This is primarily due to the fact that conventional HTML (Hyper Text Markup Language) pages do not have dynamic characteristics.

Furthermore, due to the static nature of conventional web pages, the textual content of each label is also static.

Because of the static nature of both the textual content of and the URL addresses associated with conventional labels and hyper links, web pages are not capable of adapting to or changing in response to the user's inputs to the browser page. Conventional web pages merely detect the selection of a hyper link, and load the URL address associated with the hyper link.

With conventional web pages, the label is downloaded as a static portion of the entire static web page. Therefore, if a designer of a web page is desirous of placing a label whose textual content or URL destination address changes in response to user input, a series of network transmissions between the remote computing station and the web site would be required. Depending on the network, the associated network access time can be characterized as having some amount of latency.

SUMMARY OF THE INVENTION

In accordance with the present invention, the above problems of conventional static labels in a web page on a network, such as the Internet, have been solved by a method for displaying dynamic links in a browser program operating on a remote user station in the network. An application program, adapted to operate in the browser program and containing a link label, is created where the link label is programmatically associated with a first network address. The application program can associate the link label with a second network address in response to user input at the remote user station.

The application program is downloaded from a location in the network to the remote user station, and loaded into the browser program operating in the remote user station. A window having the link label is displayed in the browser program, and upon receiving user input in the window of the browser, the link label is altered, for example, by associating the link label with a second network address in response to said user input at the remote user station. The actual text or visual appearance of the link label can also change in response to user input. Finally, parameters can be formed, based on the user input into the browser, and these parameters can be passed to other application programs downloaded to the remote user station, or these parameters can programmatically affect the content of appearance of other link labels.

The above computer implemented steps in another implementation of the invention are provided as an article of manufacture, i.e., a computer storage medium containing a computer program of instructions for performing the above described steps.

In a machine implementation of the invention, an apparatus for displaying dynamic links in a browser program has an application module, an input processing module, and a link label modification module. The application module, adapted to operate with the browser program, creates a link label associated with a first network address and can associate the link label with a second network address in response to user input at the remote user station. The input processing module processes user input received in the browser during operation of the application module and detects the relative location of an input device, such as a keyboard mouse, and the state of mouse buttons or other inputs. A link label modification module modifies the link label in response to the user input by associating the link label with a second network address. The actual text or visual appearance of the link label can also be changed. Finally, a parameters formation module can form passable parameters based on the user input into the browser, and these parameters can be passed to other application programs downloaded to the remote user station.

The great advantage or utility of the invention is that the labels within a web page can be dynamically changed so that the destination URL address can be dynamically changed in response to user input within the web page, or from receipt of dynamic parameters passed by remote computing stations in the network.

Another utility of the invention is that the textual content of the link within the web page can also be dynamically changed in response to user input into the web page or dynamic parameters passed by remote computing stations.

Another utility of the invention is that the link label can operate with characteristics resembling a hyper link, so that user's familiarity with conventional links is maintained with the use of link labels of the present invention.

Another utility of the invention is that a programmer can design a web page with a plurality of link labels to be responsive to the user inputs into the web browser page running on the remote computing station.

Another utility of the present invention is that a link in a page of a browser can be dynamically altered without necessitating any additional network transmissions, thereby improving the system's performance by reducing network access times and avoiding network latency.

The foregoing and other features, utilities, and advantages of the invention will be apparent from the following more particular description of a preferred embodiment of the invention as illustrated in the accompanying drawings.

BRIEF DESCRIPTION OF DRAWINGS

FIGS. 3A through 3C illustrate an example of a web page utilizing the link labels of the present invention.

DETAILED DESCRIPTION OF PREFERRED EMBODIMENTS

The embodiments of the invention described herein are implemented as logical operations in a computing system. The logical operations of the present invention are implemented (1) as a sequence of computer implemented steps running on the computing system and (2) as interconnected machine modules within the computing system. The implementation is a matter of choice dependent on the performance requirements of the computing system implementing the invention. Accordingly, the logical operations making up the embodiments of the invention described herein are referred to variously as operations, steps, or modules.

The operating environment in which the present invention is used encompasses general distributed computing systems wherein general purpose computers, work stations, or personal computers are connected via communication links of various types. In a client server arrangement, programs and data, many in the form of objects, are made available by various members of the system.

In accordance with the invention, users at remote terminals in a network communicate through the network to a computer server or a web site and are able to download data from the server or web site to the user's work station.

As this embodiment of the invention is described herein, a web browser program on a client station for browsing a network, such as the Internet, will be referred to as the browser, while the server work station with which the browser station is communicating during a download will be referred to as the server or the central application location.

Figure 1:
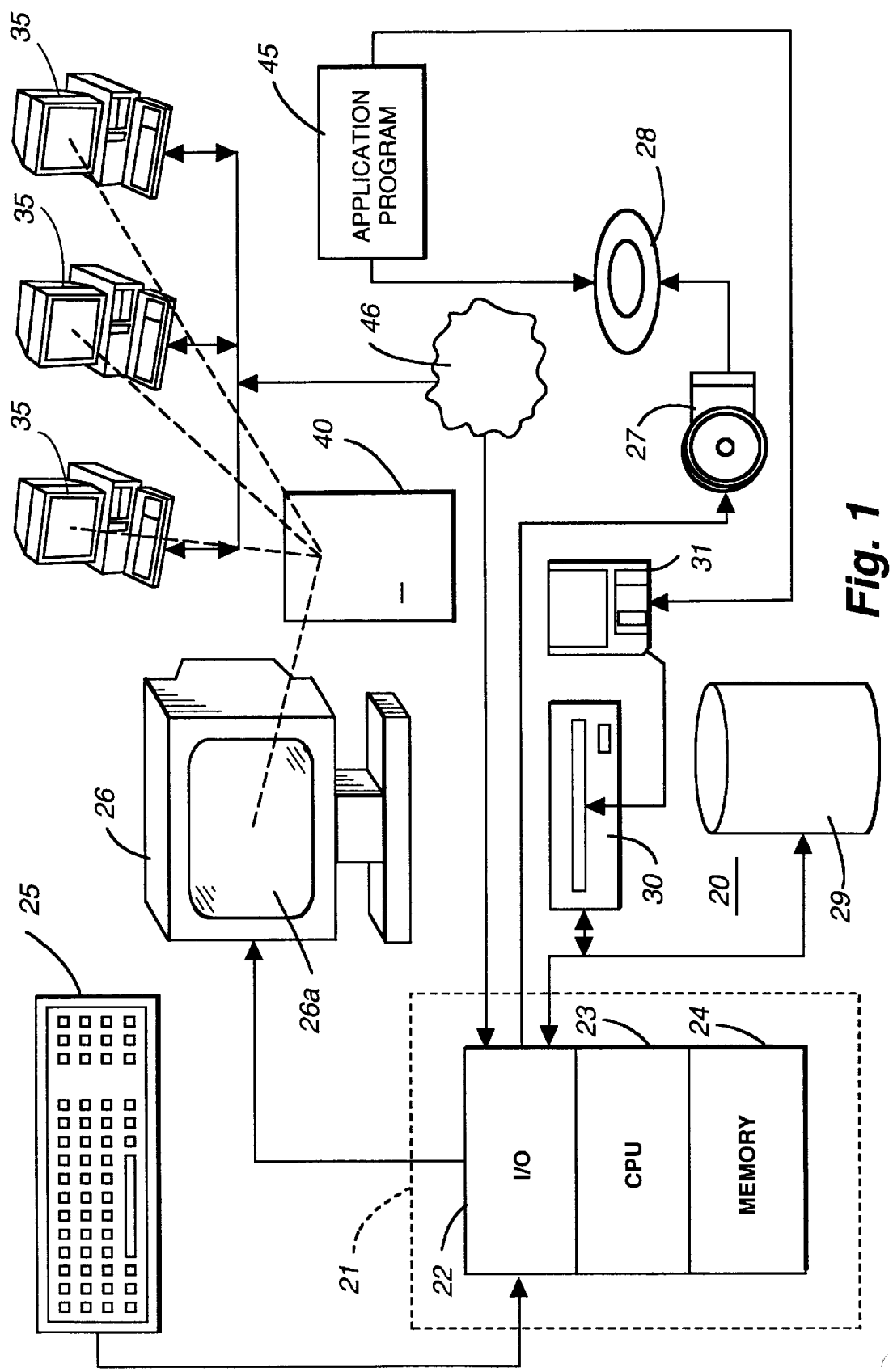
FIG. 1 illustrates a computing system acting as a client-server in a communications network, such as the Internet, to perform the logical operations of the invention.

Referring to FIG. 1, data processing system 20, acting as a server through an application program 45, places a plurality of web pages 40 for access by remote client stations 35 over network 46. These web pages 40 are originated by the application program 45. Web pages 40 can contain data including text, graphics, audio files, video files, and other forms of data. Included in web pages 40 are links which have textual labels and URL destination addresses associated therewith.

In FIG. 1, processor 21 of server 20 includes an input/output section 22, a central processing unit 23 (CPU), and a memory section 24. The input/output section 22 is connected to a keyboard 25, a display or monitor 26, and a disk storage unit 29 as well as an optical disk drive unit 27 for reading a CD ROM 28, and a floppy disk drive unit 30 for reading a diskette 31. Application program 45 may be loaded into the server 20 from either the CD ROM 28 or diskette 31. The computer program products containing mechanisms to effectuate the apparatus and methods of the present invention may reside in the memory section 24, on a disk storage unit 29, on diskette 31, or on the CD-ROM 28 of such a system. The input/output unit 22 includes a communications adapter (not shown) communicating on the network 46 to the remote client stations containing the browser. Examples of computing systems that may be used as either a server 20 or a client 35 include the SPARC systems offered by Sun Microsystems, Inc., personal computers offered by IBM Corp., and by other manufacturers of IBM compatible personal computers, and systems running the UNIX, OS/2, AIX, DOS, etc. operating systems or Solaris™ operating system.

Figure 2:
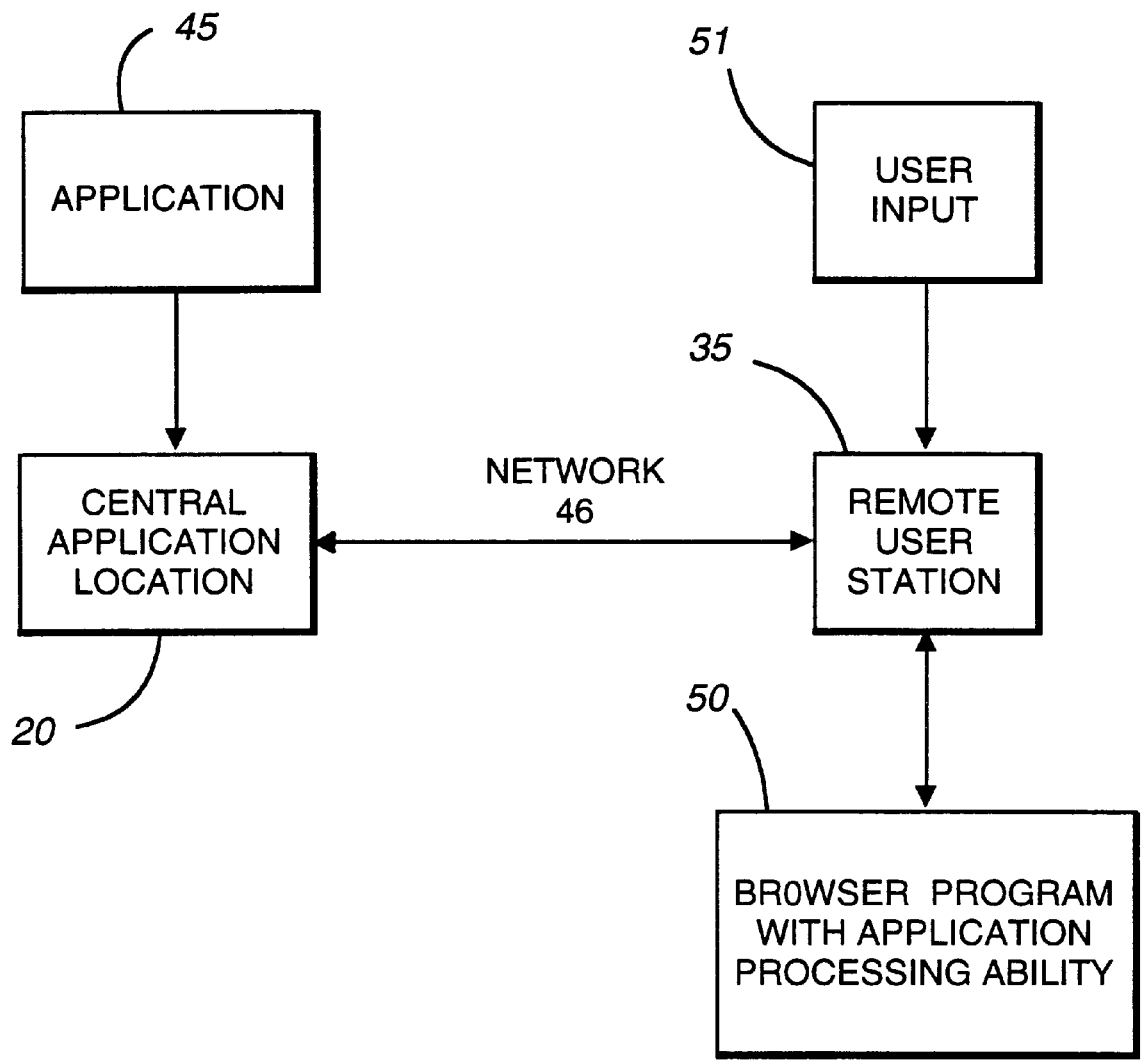
FIG. 2 is a block diagram of the preferred embodiment of the present invention.

Turning now to FIG. 2, a block diagram of the components utilized in the preferred embodiment of the present invention is shown. Remote user station 35 is connected to and communicates with central application location 20 through network 46, such as the Internet. As described with respect to FIG. 1, central application location 20 is a computing station, such as a server, capable of distributing application program 45 to other computing devices over the network 46 on request. Remote user station 35 could include a computing system having components similar to computing system 20 of FIG. 1, or could be a scaled-down version of a computing system adapted for communications over a network or the Internet. Remote user station 35 is equipped with a browser program 50 having application processing ability. In this sense, the browser program 50 permits the remote user station 35 to receive and process application programs from network 46, which are designed to run on the remote user station. For instance, Sun Microsystems, Inc. has developed a platform known as JAVA which operates in conjunction with commercially available browser software products enabling application programs to be distributed over a network from a central location for operation on remote user stations having a JAVA-enabled browser program.

The user of the remote user station 35 accesses information available over network 46 by providing user input 51 to the remote user station 35. User input 51 is generally responsive to the present content of a web page displayed on remote user station 35 through browser program 50.

The preferred embodiment of the present invention permits the creation and use of link labels which have dynamic, programmable characteristics. The link label has both a textual or visual component and a URL associated therewith. In this manner, the link label of the preferred embodiment of the present invention appears to a user on the remote user station identical to a traditional HTML hyper-link in a traditional HTML browser page. The link label of the present invention is designed to generally operate in a similar manner as a conventional HTML hyper-link, except that the link label of the present invention can change in response to user input into the browser page, parameters passed into the application, or other state changes in the computing environment.

The link label of the present invention can be altered in numerous ways, including the destination address (URL) associated with the link label, or even the textual content or visual appearance of the link label, as will be described below. The link label can also be altered in its display characteristics (such as font type, font size, color, position in the browser window, etc.) or its other characteristics can be altered (such as the action initiated upon selection of the link label). The implementation of the alterable characteristics of the link label of the present invention are a matter of choice depending upon the particular objectives to be achieved by application program 45 running within browser 50 on remote user station 35 (FIG. 2).

FIGS. 3A–3C illustrate examples of browser pages 74 which could be formed using the present invention. In FIG. 3A, display page 74 would appear on the display of remote user station 35 as a web page 40. The page 74 has a link label 71 of "HOME SERVER" with an associated data field 75 within a pull-down menu 76. Link label 72 "STATUS OF SERVER 1" is also displayed on page 74. The browser displays URL status in block 80, which can indicate the URL associated with a link label presently selected by the user. It is understood that the format of browser pages 74 and the content of the link labels 71 and 72 are by way of example only.

In accordance with the present invention, link labels 71 and 72 of FIG. 3A have dynamic characteristics and can be made to respond to user input into the browser window, as will be explained below in greater detail.

In the example of FIG. 3A, link label 71 indicates the HOME SERVER of the user Fred, and link label 71 has a URL address associated with SERVER 1, shown in block 80. As illustrated in FIGS. 3A–3B, pull-down menu 76 could contain a list 78 of other servers in which user Fred has files stored; FIG. 3B shows SERVERS 1–4 in list 78. A user could select a text field in list 78, such as SERVER 3, to obtain data on that server.

As illustrated in FIG. 3C, based on the user's input selecting SERVER 3 from list 78, the URL corresponding to HOME SERVER link label 71 would be updated to reflect the address of SERVER 3, as shown in block 80. This change in the URL corresponding to link label 71 would be programmatic based upon the software contained within application 45 downloaded to operate within the present browser page.

Additionally, FIG. 3C illustrates that link label 73 has also changed from "STATUS OF SERVER 1" to "STATUS OF SERVER 3" thereby illustrating that the textual content of a link label of the present invention can be changed as well. Since the text of link label 73 has changed based on the user selection of SERVER 3, it is understood that the URL address corresponding to link label 73 would also change to reflect the location where the status information of SERVER 3 is maintained.

Figure 4:
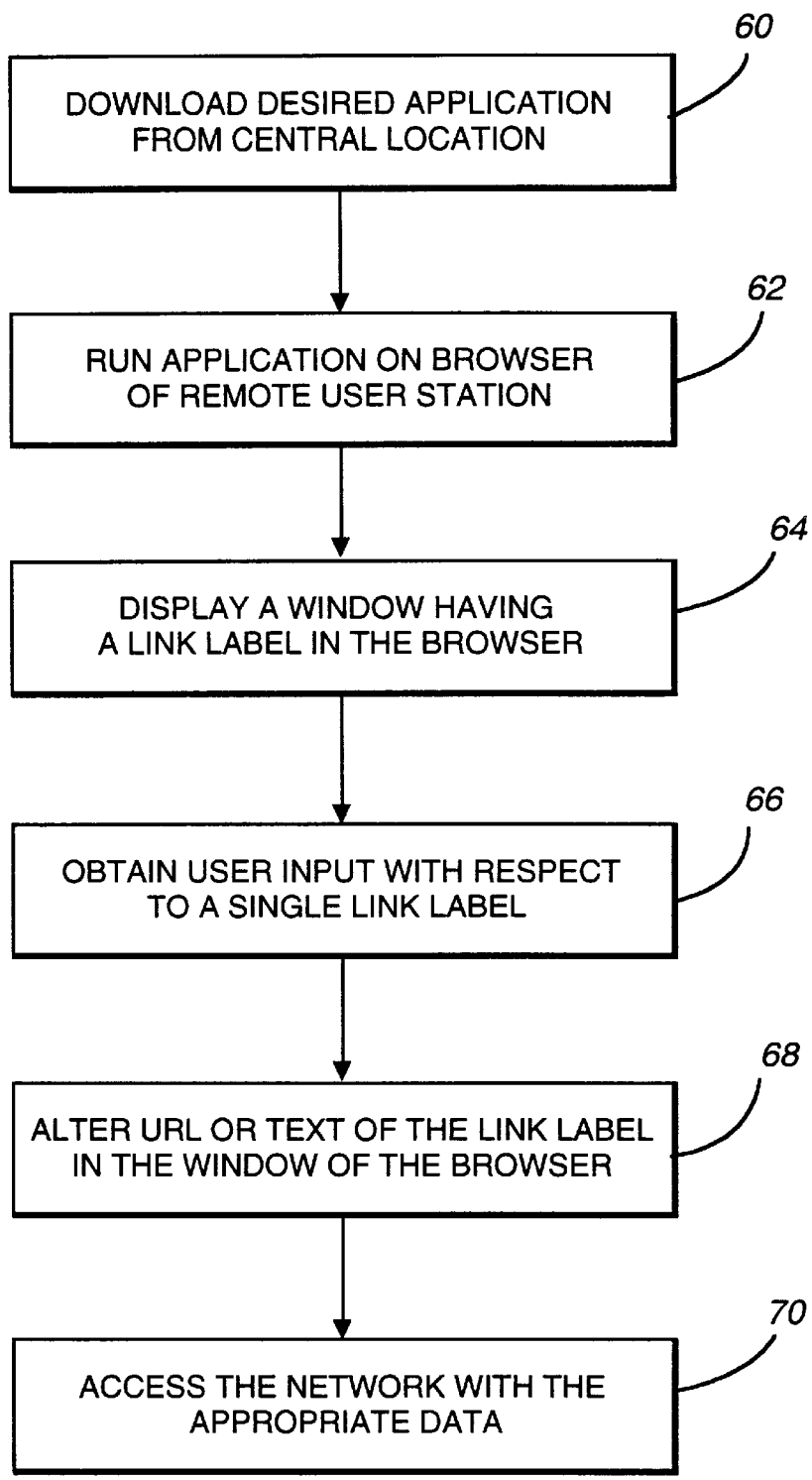
FIG. 4 illustrates the logical operations of the preferred embodiment of the invention to create and display a link label in a browser page.

Turning now to FIG. 4, the logical operations to perform the preferred embodiment of the invention are shown. Operation 60 downloads the desired application 45 from the central application location 20 over network 46. Operation 60 can occur in response to user input, such as the user selecting through browser program 50 (FIG. 2) a web site having an application program available for download.

In the preferred embodiment of the present invention, downloading a desired application over the network appears, from the user's perspective, identical to downloading information generally from a web site over the Internet. The fact that the user is downloading an application designed to run within the browser of the user's remote station may be transparent to the user, as this operation can be made to appear identical to a download of a traditional HTML web page.

Operation 62 runs the downloaded application on the browser of the remote user station. The application program 45 (FIG. 2) contains the constructs for forming the link labels in the browser running on the remote user station, and can vary depending upon the software content provided in the application. Hence, a programmer is free to design a web page display which can contain programmatic constructs such as if/then control statements. In this manner, the operations of application 45 are dependent upon the programmer's implementation of the software contained therein. In a JAVA platform, the application 45 could be implemented as an "applet" for downloading into a JAVA-enabled browser.

In accordance with the preferred embodiment of the present invention, the application program or module is adapted to operate in the browser program and contains a link label programmatically associated with a first network address. The application program can associate the link label with a second network address in response to user input at the remote user station.

Once the application is running in the browser, operation 64 displays a window, within the browser of the remote user station, having a link label (for example, 71, 72, and 73 in FIGS. 3A–3C).

Because the link label of the present invention is defined within the application program downloaded from the central location, the link label is a programmatic construct which is characterized by a dynamic nature, as described above.

Input processing module 66 (FIG. 4) obtains user input with respect to a single link label displayed by operation 64 in the browser window. This input can include selection by the user of the link label, or more generally user activity within the browser window.

Link label modification module 68 alters the link label as dictated by the application program 45 in response to user input. Under the preferred embodiment of the present invention, the URL or text of the link label in the browser window is modified based on user activity within the browser window. Input processing module 66 and link label modification module 68 are also shown in FIGS. 6, and 7A–7B.

Operation 70 then accesses the network with the appropriate data formed in the application. As will be described below, operation 70 can be programmed to access the network after the user has armed and fired a link label which would require a transfer of data external to the application program running on the browser of the remote user station.

Figure 5:
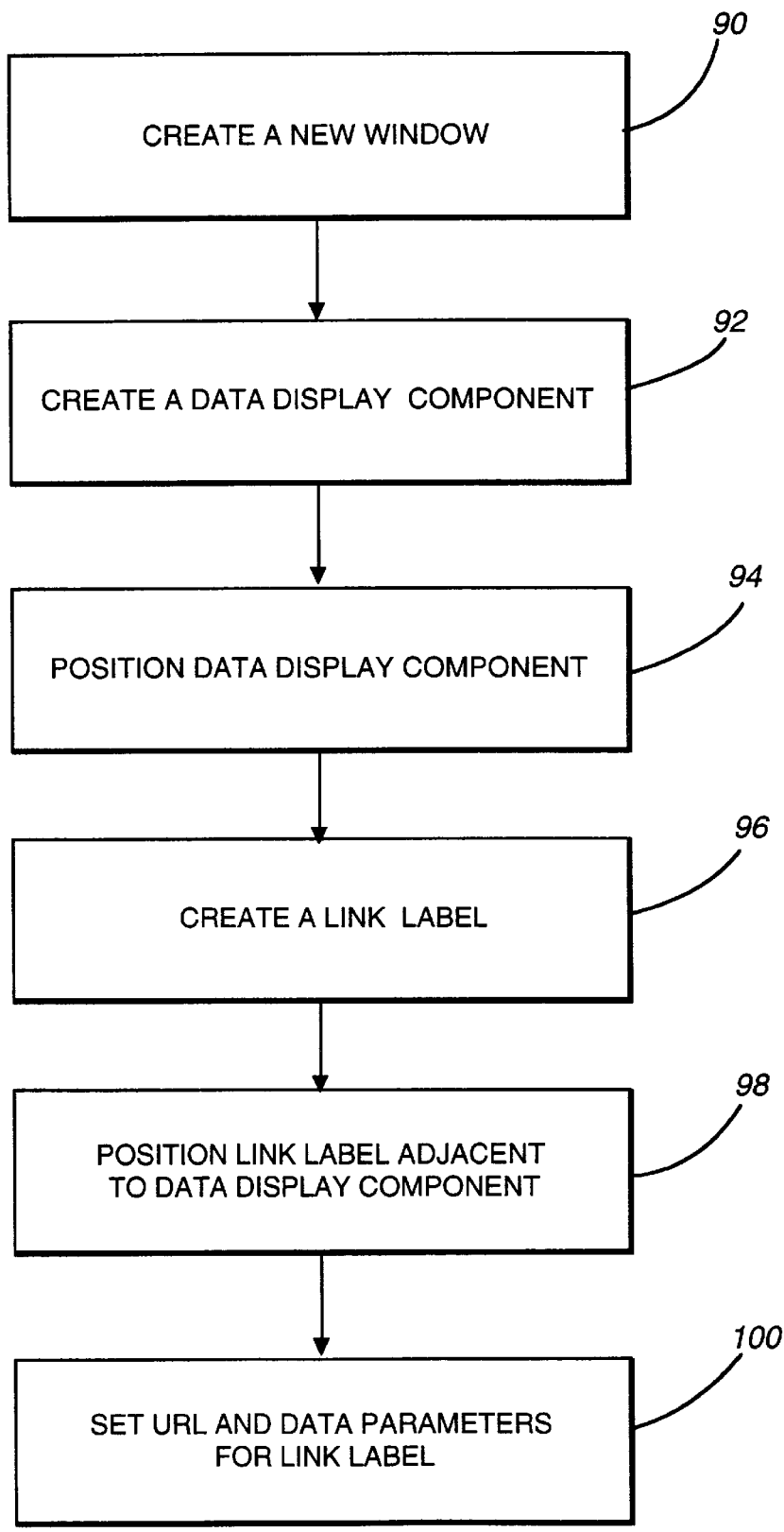
FIG. 5 illustrates the logical operations of creating a window in a browser having a link label.
Figure 6:
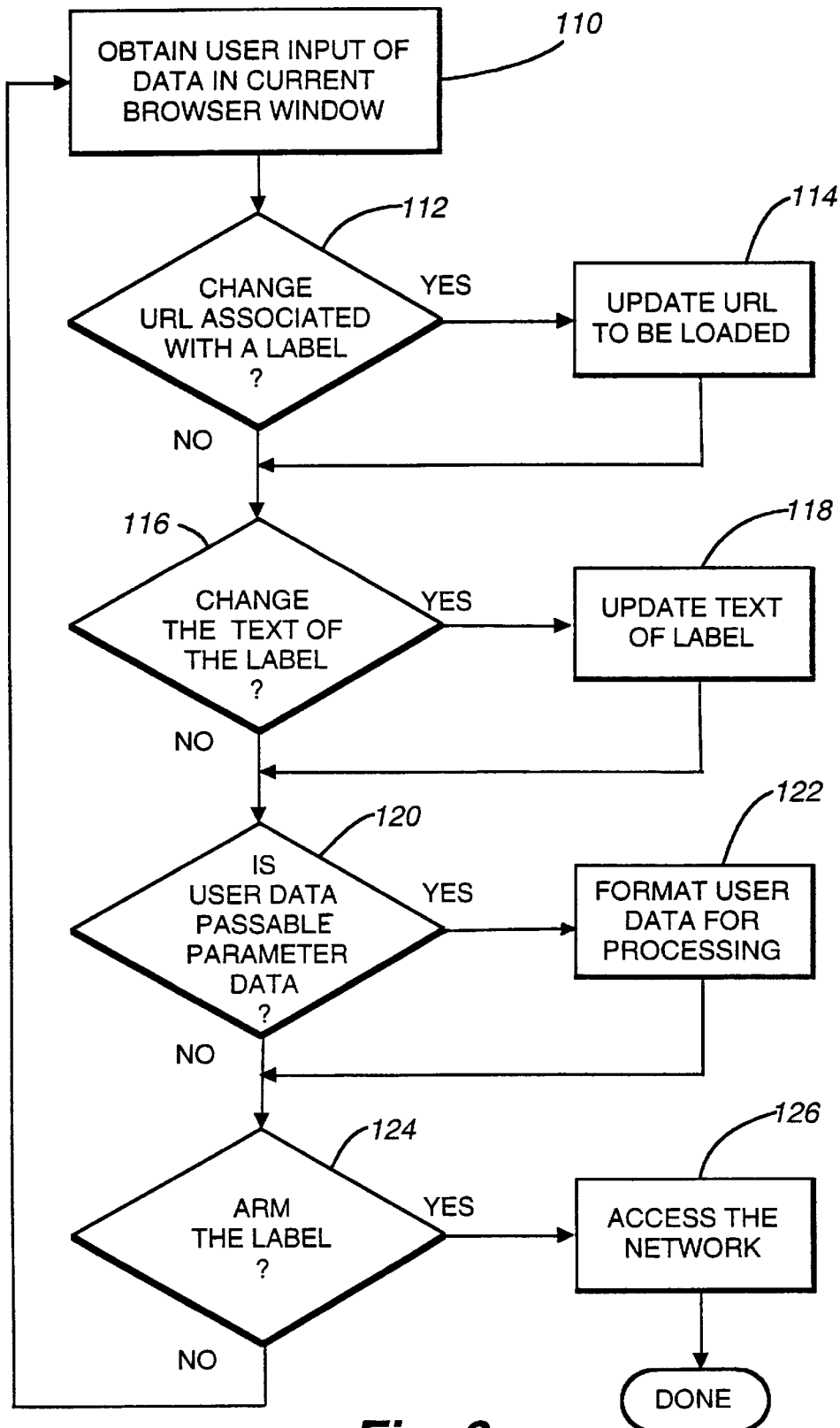
FIG. 6 illustrates the logical operations of processing user input to alter a link label of the present invention displayed in a browser page.
Figure 7A:
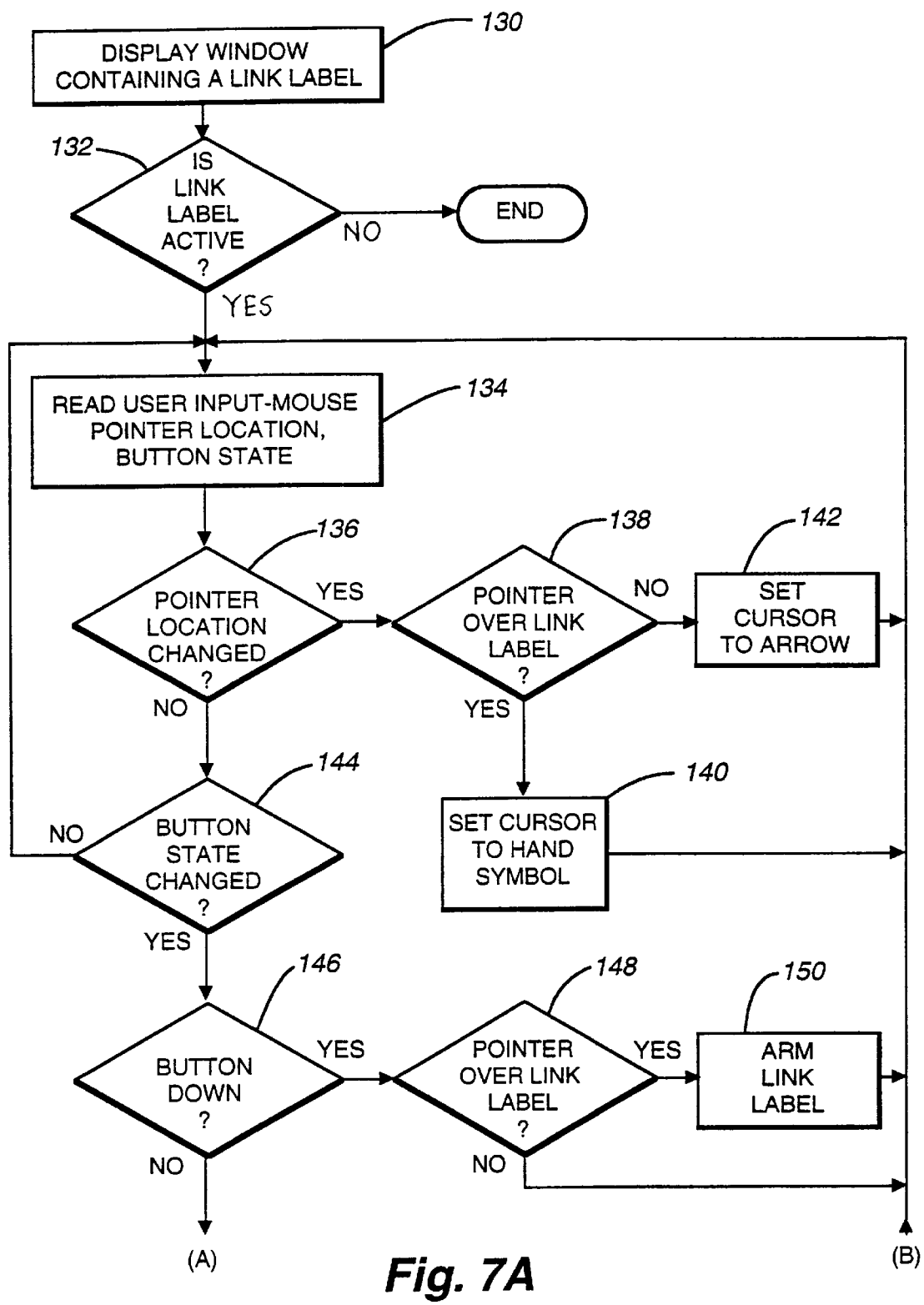
FIGS. 7A through 7B illustrate the logical operations of detecting the user's input into a web browser page to utilize a link label of the present invention.
Figure 7B:
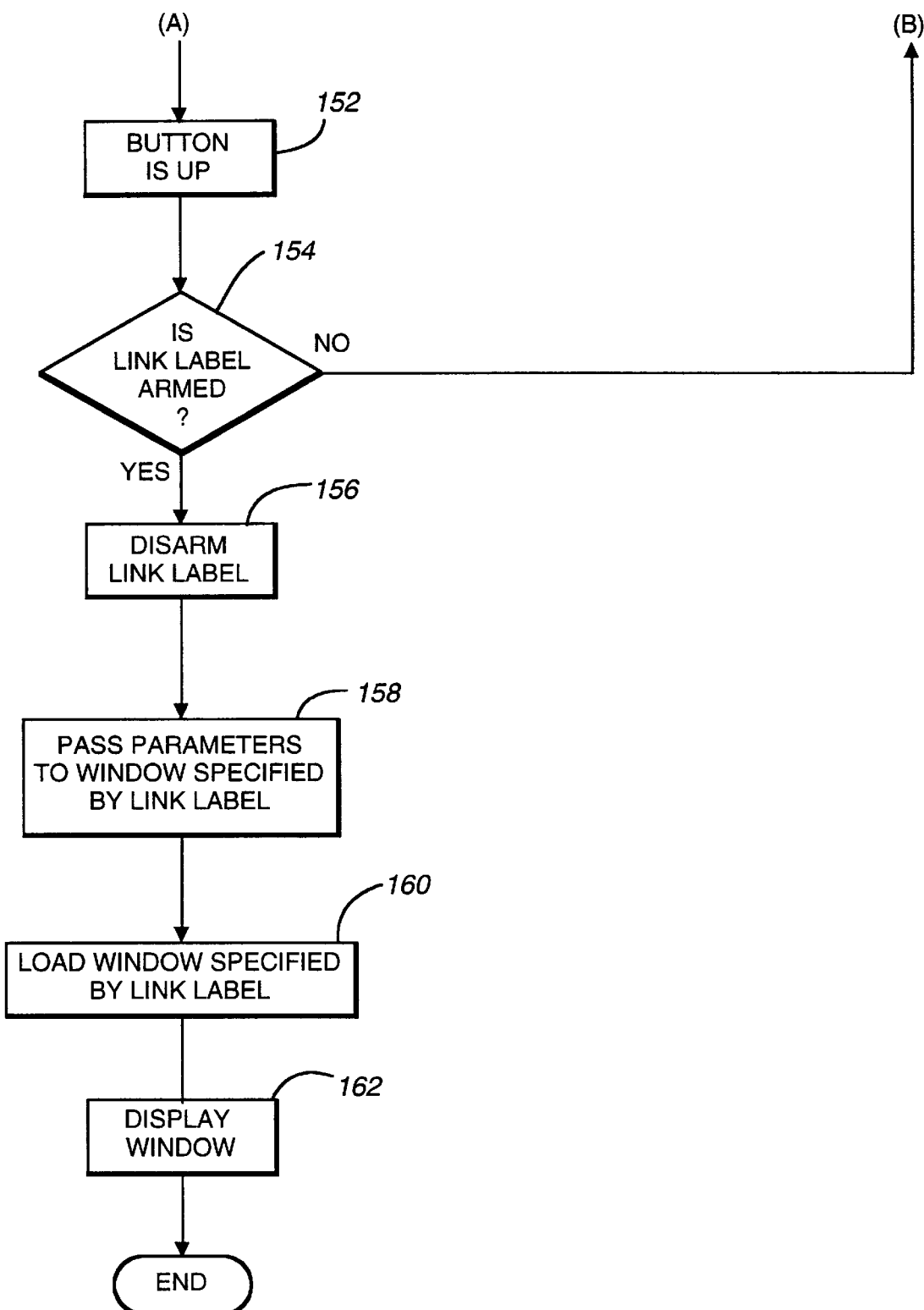

FIGS. 5–7 illustrate the logical operations to implement the link label of the present invention. FIG. 5 illustrates the operations contained in application program 45 for creation and use of a link label. Operation 90 creates a new window within the browser for the display of information including the link label. Operation 92 creates a data display component associated with a link label, such as text field 75 in FIG. 3A, and operation 94 positions the data display component within the window.

Operation 96 creates a link label, as a programmatic component of application program 45 (FIG. 2). Operation 98 positions the link label adjacent to the data display component, while operation 100 sets the URL and data parameters for the link label for subsequent use. Together these operations are used to place the link label within the window of a browser running on a remote user station.

FIG. 6 illustrates the logical operations of obtaining user input within a browser page and appropriately modifying the link label. These operations can also be included as part of application program 45 which is downloaded to the remote user station. Operation 110 obtains user input of data within the current browser window. The user input data can take the form of textual data, data from an input device such as a keyboard, mouse, or other forms of user input data. Decision operation 112 determines if the URL associated with the label should be changed responsive to the user input. If so, operation 114 alters or updates the URL associated with the link label to be loaded.

Operation 116 determines if the text of the link label should be changed. If so, operation 118 appropriately updates the text of the label. Operation 120 determines if the user data contains parameter data which can be passed to another application 45. If the user input data contains passable parameter data, then operation 122 formats the user data for subsequent processing. Decision operation 124 determines if the link label should be armed or loaded into the browser for communications with the device specified by the URL address contained in the link label. If so, operation 126 accesses the network with the correct URL information.

FIGS. 7A–7B illustrate the logical operations of processing the user input into the browser window and appropriately utilizing the link label therefrom.

In FIG. 7A, operation 130 displays a browser window containing a link label. Operation 132 determines whether the link label is an active link label. Because of the programmatic nature of the link labels of the present invention, one feature of a link label is that it can be deactivated programmatically so that user selection of a deactivated link label would have no effect. If decision operation 132 determines that the link label is deactivated, then no further action is taken. Otherwise, the operations can proceed to operation 134.

Operation 134 reads the user input within the browser window. While it will be understood that the user input could comprise a variety of different forms (i.e. textual input, voice commands, keyboard mouse inputs, etc.), the preferred embodiment of the present invention utilizes keyboard mouse inputs. In particular, the mouse pointer or cursor location is tracked, and the mouse button state is also detected.

Decision operation 136 determines if the mouse pointer/cursor location has changed. If the location has changed, then decision operation 138 determines if the mouse pointer/cursor is positioned over a link label. If so, then operation 140 changes the cursor from an arrow to a hand symbol, as is done with existing browser displays. Otherwise, the cursor is set to an arrow at operation 142, and subsequent user input is again read at operation 134.

If the location of the pointer/cursor has not changed, as determined at operation 136, then operation 144 determines if the mouse button state has changed. For instance, operation 144 could determine if the mouse button has been depressed or released. If the button state has not changed, then control is returned to read subsequent user input at operation 134. Otherwise, operation 146 determines if the mouse button is now down.

If the mouse button is down, then operation 148 determines if the position of the mouse pointer/cursor is over a link label. If so, then operation 150 arms the link label by setting a flag to indicate that the user has armed the label. The label is "fired", or passed to the network, under the appropriate circumstance at operations 158–160 described below. If the mouse pointer/cursor is not over a link label, then operation 148 passes control back to operation 134 to read subsequent user input.

If the mouse button is not down, then operation 146 passes control to operation 152 in FIG. 7B, indicating that the mouse button has now been released to the up position. Decision operation 154 determines if a link label has already been armed. If not, then operation 154 passes control to operation 134 to read subsequent user input. If, however, a link label has been armed then operation 156 disarms the label and operation 158 passes parameters developed within the browser window, including the URL address specified by the link label, to the browser for access to the network device specified thereby. The URL has now been "fired".

Operation 160 then loads the window specified by the URL address associated with the link label, by accessing the network and retrieving the desired information. Operation 162 then displays the contents of the desired information within the browser of the user's remote station.

Figure 8:
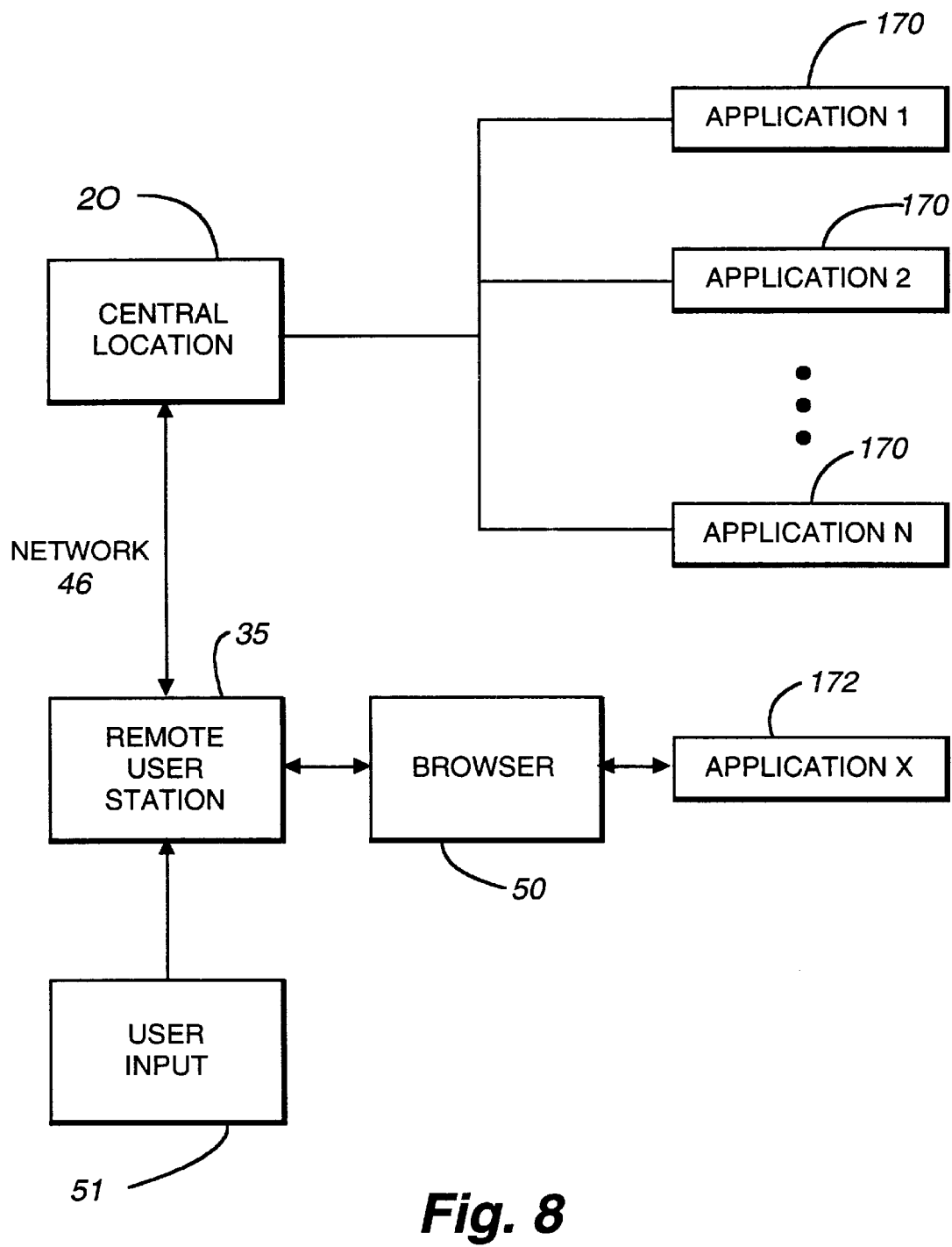
FIG. 8 illustrates an alternative embodiment of the present invention for passing data parameters between application programs for dynamic processing therein.

FIG. 8 illustrates an alternative embodiment wherein the application program 172 running on browser 50 of remote user station 35 passes parameters over network 46, such as the Internet, to central location 20. Central location 20 contains a plurality of applications 170 which have each been adapted to receive paramaterized data. Applications 170 can be general purpose modules which produce an output based on an input and the algorithms contained therein.

Upon user input 51 into remote user station 35, the parameterized data is passed to the central location and the appropriate application 170 receives the data and then central location 20 transfers the application to remote user station 35 for operation within browser 50.

Alternatively, the paramaterized data based on user input 51 can be processed by a first application running on user station 35, and stored within browser 50 in a central posting location (not shown). This data could be used in determining which application 170 should be subsequently downloaded. After a second application 170 is downloaded to the remote user station 35, the second application would then operate and process the paramaterized data in a dynamic manner.

While the invention has been particularly shown and described with reference to a preferred embodiment thereof, it will be understood by those skilled in the art that various other changes in the form and details may be made therein without departing from the spirit and scope of the invention.

What is claimed is:

1. A method for displaying dynamic links in a browser program operating on a remote user station in a computer network, said method comprising the computer implemented steps of:

creating an application program adapted to display a dynamically alterable link label capable of being selected by a user, said link label having a variable textual portion and a variable address portion, wherein selecting said link label activates the browser program to load a browser page specified by a current value of said variable address portion, said application program also adapted to display a plurality of user-selectable variables, wherein a unique address of a browser page is associated with each of said variables, said application program adapted to operate in the browser program;

downloading said application program from a location in the network to said remote user station;

running said application program in the browser program operating in said remote user station;

displaying said link label;

displaying said plurality of user-selectable variables;

receiving user input to select one of said user-selectable variables;

modifying the variable textual portion of said link label in accordance with the user-selectable variable selected by the user;

displaying the variable textual portion of said link label as modified;

modifying the variable address portion of said link label in accordance with the user-selectable variable selected by the user; and when the user activates the link label, loading into the browser program the unique address specified by the variable address portion of the link label as modified, so that the browser page specified by thereby is displayed to the user within the browser program.

2. An apparatus for displaying dynamic links in a browser program operating on a remote user station in a computer network, said apparatus comprising:

an application module for displaying a dynamically alterable link label capable of being selected by a user, said link label having a variable textual portion and a variable address portion, wherein selecting said link label activates the browser program to load a browser page specified by a current value of said variable address portion, said application module also adapted to display a plurality of user-selectable variables, wherein a unique address of a browser page is associated with each of said variables, said application module adapted to operate within said browser program;

an input processing module for processing user input received in the browser during operation of the application module, said input processing module adapted to detect a relative location of an input device and the state of input buttons, said input processing module receiving user input to select one of said user-selectable variables; and a link label modification module for modifying the link label in response to said user input at the remote user station, said modification module modifying the variable textual portion of said link label in accordance with the user-selectable variable selected by the user, and modifying the variable address portion of said link label in accordance with the user-selectable variable selected by the user; and if the user activates the link label, loading into the browser program the unique address specified by the variable address portion of the link label as modified, so that the browser pare specified by thereby is displayed to the user within the browser program.

3. A method for displaying dynamic links in a browser program operating on a remote user station in a computer network, said method comprising the computer implemented steps of:

creating an application program adapted to display an alterable link label capable of being selected by a user, said link label being programmatically associated with a first network address, said link label having a variable textual portion and a variable address portion, wherein selecting said link label activates the browser program to load a browser page specified by a current value of said variable address portion, said application program also adapted to display a plurality of user-selectable variables, wherein a unique address of a browser page is associated with each of said variables, said application program adapted to operate in the browser program;

downloading said application program from a location in the network to said remote user station;

running said application program in the browser program operating in said remote user station;

displaying said link label;

displaying said plurality of user-selectable variables;

receiving user input to select one of said user-selectable variables;

modifying the variable textual portion of said link label in accordance with the user-selectable variable selected by the user;

displaying the variable textual portion of said link label as modified;

modifying the variable address portion of said link label in accordance with the user-selectable variable selected by the user; and when the user activates the link label, loading into the browser program the unique address specified by the variable address portion of the link label as modified, so that the browser page specified by thereby is displayed to the user within the browser program.

4. The method of claim 3, wherein said receiving user input step further comprises receiving dynamic parameters passed into the application program.

5. The method of claim 3, wherein said receiving user input step further comprises receiving dynamic parameters passed into the application program from the remote user station.

6. The method of claim 3, wherein said receiving user input step further comprises receiving dynamic parameters passed into the application program from another user station across the computer network.

7. The method of claim 3, wherein said receiving user input step further comprises receiving dynamic parameters passed into the application program as provided by user input into the user station.

* * * * *